United States Patent
Takatori et al.

(10) Patent No.: US 6,408,134 B2
(45) Date of Patent: Jun. 18, 2002

(54) INSTANT PHOTO FILM PACK

(75) Inventors: Tetsuya Takatori; Tomoyuki Takahashi, both of Kanagawa (JP)

(73) Assignee: Fuji Photo Film Co., Ltd., Kanagawa (JP)

(*) Notice: Subject to any disclaimer, the term of this patent is extended or adjusted under 35 U.S.C. 154(b) by 0 days.

(21) Appl. No.: 09/832,824

(22) Filed: Apr. 12, 2001

(30) Foreign Application Priority Data

Apr. 12, 2000 (JP) ........................................ 2000-111048

(51) Int. Cl.⁷ .............................................. G03B 17/50
(52) U.S. Cl. ............................ 396/32; 396/527; 396/38
(58) Field of Search ........................... 396/32, 38, 527, 396/583; 206/455

(56) References Cited

U.S. PATENT DOCUMENTS 6,183,144 B1 * 2/2001 Mizuno et al. ............. 396/518
6,195,508 B1 * 2/2001 Katayama et al. ............ 396/32

FOREIGN PATENT DOCUMENTS

| JP | 2000-081688 | 3/2000 | ............ G03C/8/42 |
| JP | 2000-089353 | 3/2000 | ........... G03B/17/52 |

* cited by examiner

*Primary Examiner*—D Rutledge
(74) *Attorney, Agent, or Firm*—Sughrue Mion, PLLC

(57) ABSTRACT

A film pack is comprised of a case body and plural film units stacked inside the case body. An exposure opening is formed in the front wall of the film pack, and an ejection slit for advancing the film unit out of the film pack is formed in the upper wall. In the ejection slit, front and rear slit edges are confronted with each other. Engaging ridges are provided on the middle of the front slit edge. When external force is applied to the front wall, the engaging ridges press an engaged portion, which is provided in the middle of the rear slit edge. Then, the engaged portion is depressed and engaged with the engaging ridges. Thereby, it is possible to prevent further deformation of the front wall, which causes rupture of a processing fluid pod in the film unit.

15 Claims, 16 Drawing Sheets

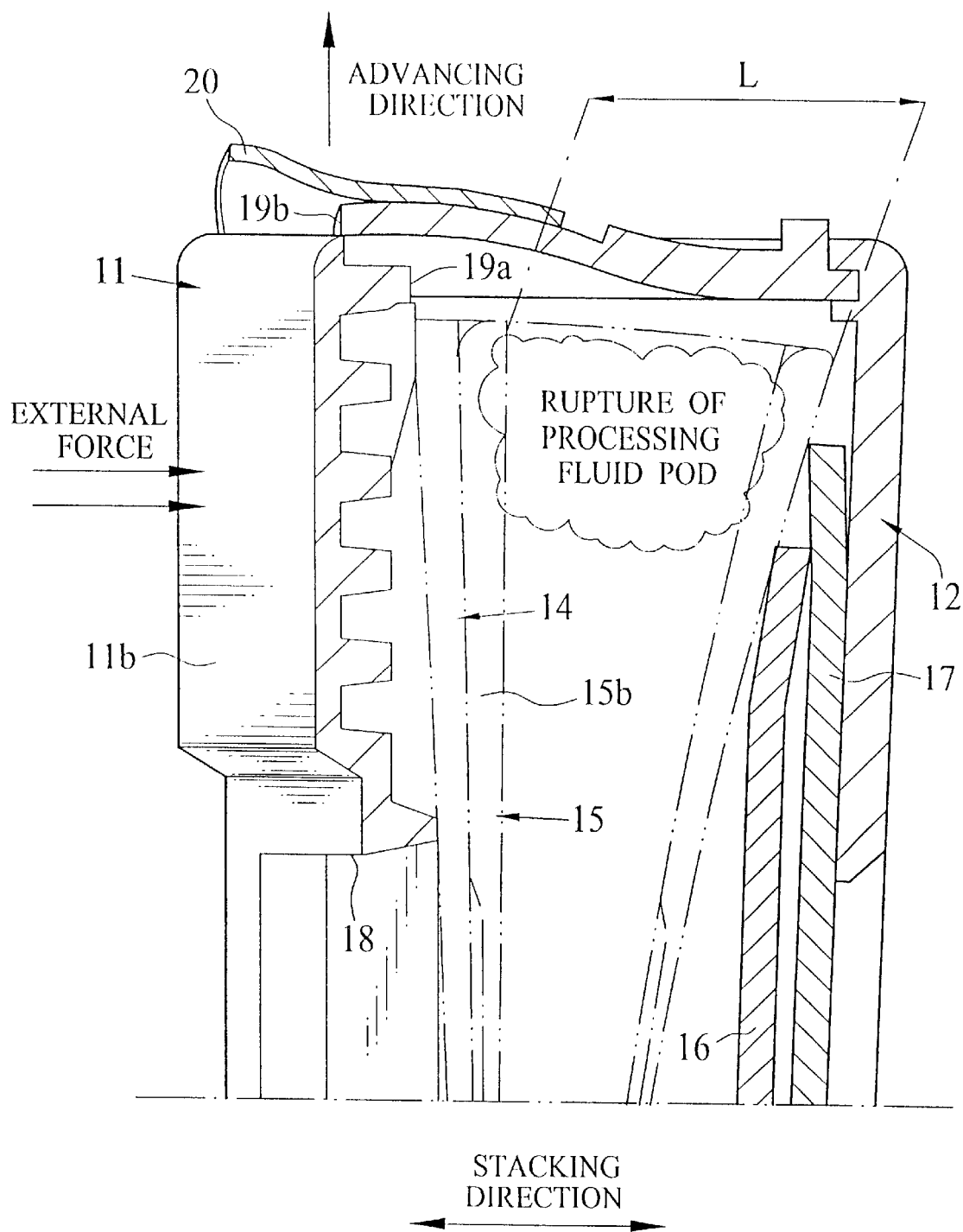

INSTANT PHOTO FILM PACK

BACKGROUND OF THE INVENTION

1. Field of the Invention

The present invention relates to an instant photo film pack that has plural instant photo film units with processing fluid pods and a case body for containing the instant photo film units. More particularly, the present invention relates to an instant photo film pack for preventing rupture of the processing fluid pod by excessive deformation of the case body.

2. Background Arts

An instant camera for use with an instant photo film pack (hereinafter referred to as film pack) is well-known. Japanese Laid-Open Patent Application (JP-A) No. 2000-81688 discloses a film pack having a box-shaped case body and plural instant photo film units (hereinafter referred to as film units) contained in the case. As shown in FIGS. 10 and 11, the case body, comprised of a case body 11 and a rear cover 12, contains a film cover 14, a plurality of film units 15, a first resilient plate 16 and a second resilient plate 17. All elements for comprising the film pack are formed from plastic material having light-tightness. The film unit 15 includes a processing fluid pod 15b, an exposure area 15a and a trap portion 15c, which are provided along an advancing direction of the film unit 15 in this order listed. The processing fluid pod 15b contains processing fluid for developing a latent image, recorded in the exposure area 15a, into a positive image. A surplus of processing fluid is accepted in the trap portion 15b. The processing fluid pod 15b and the trap portion 15c have a thickness larger than that of the exposure area 15a.

An exposure opening 18 is formed through a front wall 11a of the case body 11, and an ejection slit 19 is formed through an upper wall 11b. The film cover 14 and plural film units 15 are stacked in a stacking direction, and contained in the case body 11 through a rear opening formed in the rear side of the case body 11. The rear opening is covered with the rear cover 12. The exposure opening 18 is covered with the film cover 14, which is ejected out of the case body through the ejection slit 19 when the film pack is loaded in the instant camera. After ejection of the film cover 14, the first and second resilient plates 16 and 17 press the film units 15 toward the front wall 11a, so the exposure area 15a of the uppermost film unit 15 appears through the exposure opening 18. A subject image is exposed in the exposure area 15a through the exposure opening 18, and then the film unit 15 is advanced out of the instant camera through the ejection slit 19. In ejecting the film unit 15, the processing fluid pod 15b is ruptured to spread processing fluid over the whole exposure area 15a, so the positive image is developed in a few minutes.

The ejection slit 19 has a long and narrow opening, and has a size such that the film cover 14 or the film unit 15 is able to pass therethrough. The ejection slit 19 is covered with a resilient light-shielding flap 20 in a light-tight manner. The light-shielding flap 20 is partially stuck to the outer surface of the upper wall 11b, and is partially peeled off to open the ejection slit 19 when the film unit 15 is fed in the advancing direction.

As shown in FIG. 12, the ejection slit 19 has a width larger than the thickness of the film unit 15, so there is a possibility that two or more film units 15 are advanced through the ejection slit 19 simultaneously. In order to prevent this, JP-A No. 2000-89353 discloses a film pack having plural guide projections 22 on an inside of a front wall 11a behind the ejection slit 19, as shown in FIGS. 12 and 13. The guide projections 22 are disposed at certain intervals in the crosswise direction. The guide projection 22 is high in the stacking direction enough so that a top surface thereof is visible through the ejection slit 19. Thereby, the film pack 15 is advanced without being caught by a front slit edge 19a. Moreover, in order to ensure to guide the film unit 15 toward the ejection slit 19, each of the guide projections 22 has a taper inclined toward the front wall 11a.

For keeping strength, the front wall 11a is required to be formed as thick as possible. In that case, however, since the front case 11 is formed from plastic material by injection molding, the front wall can have molding sink marks. Thus, plural grooves 11c are formed in the front wall 11a for preventing molding sink marks. Between the adjacent grooves 11c, ribs 11d are formed.

However, the exposure opening 18 is larger than the front wall 11a, and the upper wall 11b has a long ejection slit 19. Thus, the front wall 11a does not have strength enough to resist an external force. As shown in FIG. 14, when a strong external force in the stacking direction is applied to the front wall 11a, the front wall 11a is curved inward such that the front slit edge 19a of the ejection slit 19 comes in contact with an opposite rear slit edge 19b. With stronger force, the front wall 11a is deformed such that the front slit edge 19a is located below the rear slit edge 19b, as shown in FIGS. 15 and 16. In that case, the film unit 15 is pressed by the front wall 11a, so the length L of the stacked film units 15 along the stacking direction becomes small. Then, the processing fluid pod 15b can be ruptured to spread processing fluid over the exposure area of unexposed film unit 15, which then becomes useless.

SUMMARY OF THE INVENTION

In view of the foregoing, an object of the present invention is to provide an instant photo film pack for preventing rupture of a processing fluid pod in an instant photo film unit, even when an external force is applied to a case body.

To achieve the above objects, an instant photo film pack of the present invention includes an exposure opening formed in a front wall of the film pack, an ejection slit formed in an upper wall of the film pack, at least one engaging projection which is provided on the front slit edge of the ejection slit and extended in the advancing direction, and an engaged portion which is provided in the rear slit edge of the ejection slit. The engaging projection has a shape of a triangular prism, and is provided on the middle of the front slit edge. The engaged portion is provided in the middle of the rear slit edge. When the front wall is deformed to close the ejection slit, the engaging projection presses the engaging portion. The engaged portion is depressed to be engaged with the engaging projection. Thus, it is possible to prevent further deformation of the front wall, which causes rupture of the processing fluid pod in the film unit.

In order to prevent the film unit from being scratched by the engaging projection, the front slit edge has a depression in the center with reference to the crosswise direction of the film unit. A slope is formed in the upper wall, to project the engaged portion toward inside of the case body, and the outer corner of the engaged portion is tapered off. On inside of the front wall behind the ejection slit, plural guide projections for guiding the film unit toward the ejection slit are arranged at certain intervals. A gap is formed between the engaging projection and the guide projection provided behind the engaging projection. When the front wall is deformed excessively, the engaged portion is fit into the gap.

When the engaged portion is depressed by the engaging projection, burrs are formed in the engaged portion. In order to ensure smooth movement of the stack of film units in the stacking direction, a regulating projection for regulating positions of the film units is provided on an inside of the upper wall. Instead of providing the regulating projection, an inner corner of the engaged portion may be tapered off.

BRIEF DESCRIPTION OF THE DRAWINGS

The above and other objects and advantages of the present invention will become apparent from the following detailed description of the preferred embodiments when read in association with the accompanying drawings, which are given by way of illustration only and thus are not limiting the present invention. In the drawings, like reference numerals designate like or corresponding parts throughout the several views, and wherein:

FIG. 16 is a partial sectional view of the conventional film pack of FIG. 10 with a front wall further pressed down, a front slit edge being located below the rear slit edge.

DETAILED DESCRIPTION OF THE EMBODIMENT

Figure 1:
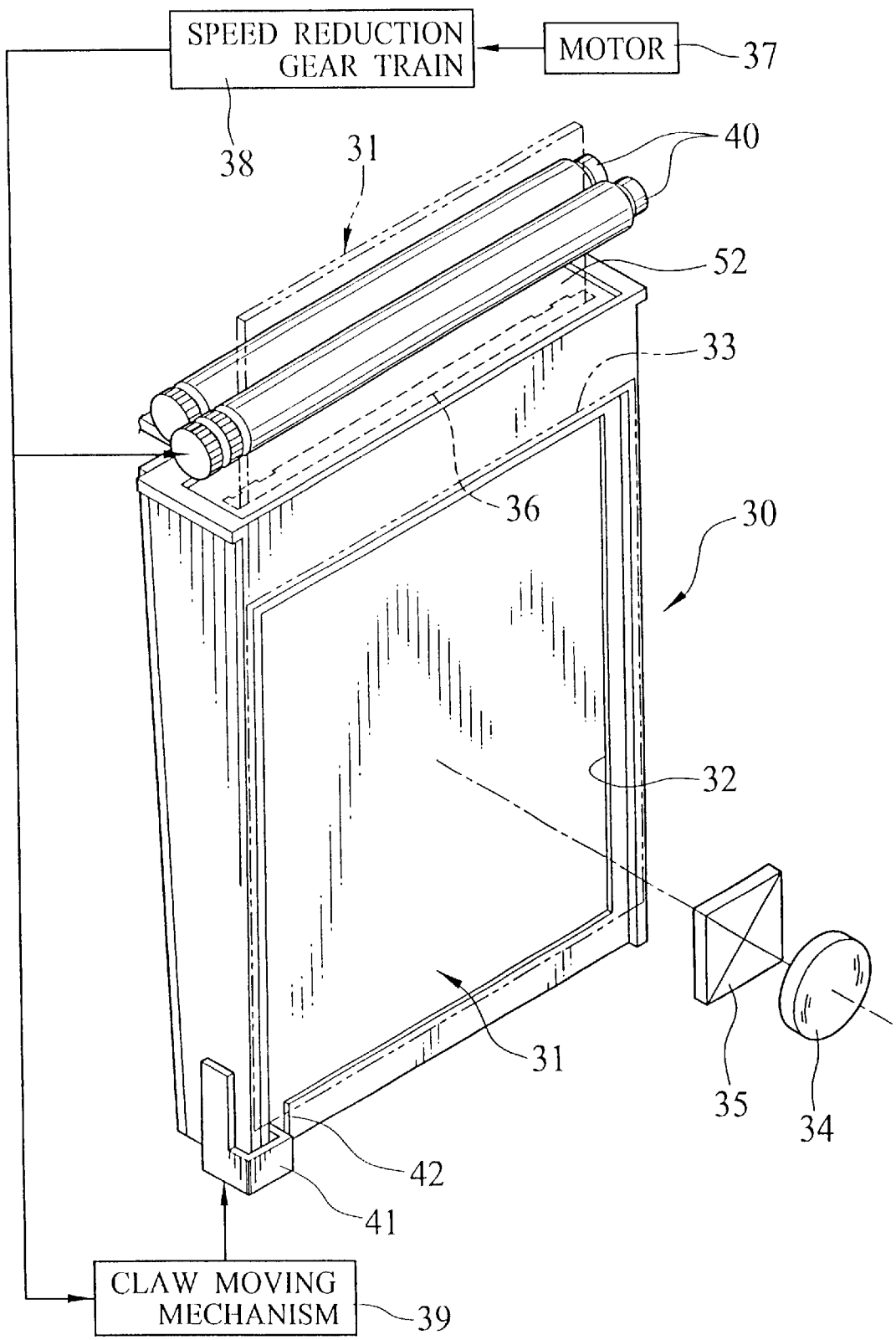
FIG. 1 is a schematic view of a film advancing mechanism with a instant photo film pack of the present invention.

As shown in FIG. 1, a film pack 30 with an exposure opening 32 is loaded in a pack loading chamber formed in an instant camera or the like. The pack loading chamber has an exposure frame 33 that is confronted with the exposure opening 32 and slightly larger than the exposure opening 32. The film pack 30 has a film cover 31 for keeping a plurality of film units in light-tight fashion. After loading the film pack 30 in the pack loading chamber, a film advancing mechanism is automatically activated to advance the film cover 31 out of the film pack 30 through an ejection slit 36. In response to a shutter release operation, a shutter mechanism 35, provided behind a taking lens 34, is activated to expose a latent image onto the film unit through the exposure opening 32.

The film advancing mechanism is comprised of a motor 37, a speed reduction gear train 38, a well-known claw moving mechanism 39 and a spread roller set 40. The claw moving mechanism 39 and the spread roller set 40 are driven by the motor 37 by way of the reduction gear train 38. The claw moving mechanism 39 moves a claw member 41 inside the film pack 30 through a cutout 42, for pressing a trailing end of the film unit. Then, the film unit is fed toward the spread roller set 40 through the ejection slit 36.

The film unit is nipped by the spread roller set 40, and advanced out of the instant camera. In advancing the film unit, a processing fluid pod, provided in the film unit, is ruptured to spread the processing fluid over an exposure area, so that the latent image is developed into a positive image.

Figure 2:
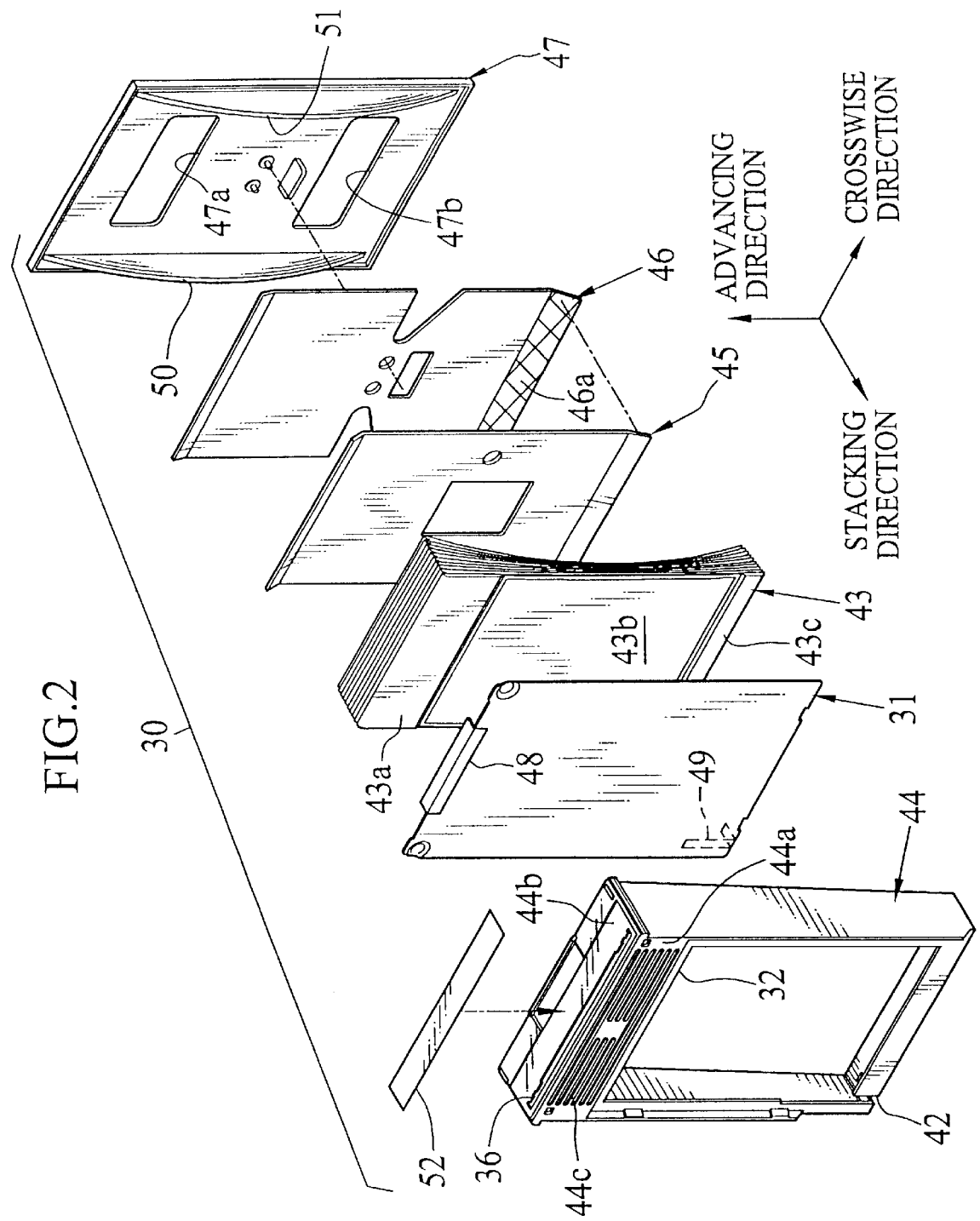
FIG. 2 is an perspective view of the film pack of FIG. 1.
Figure 10:
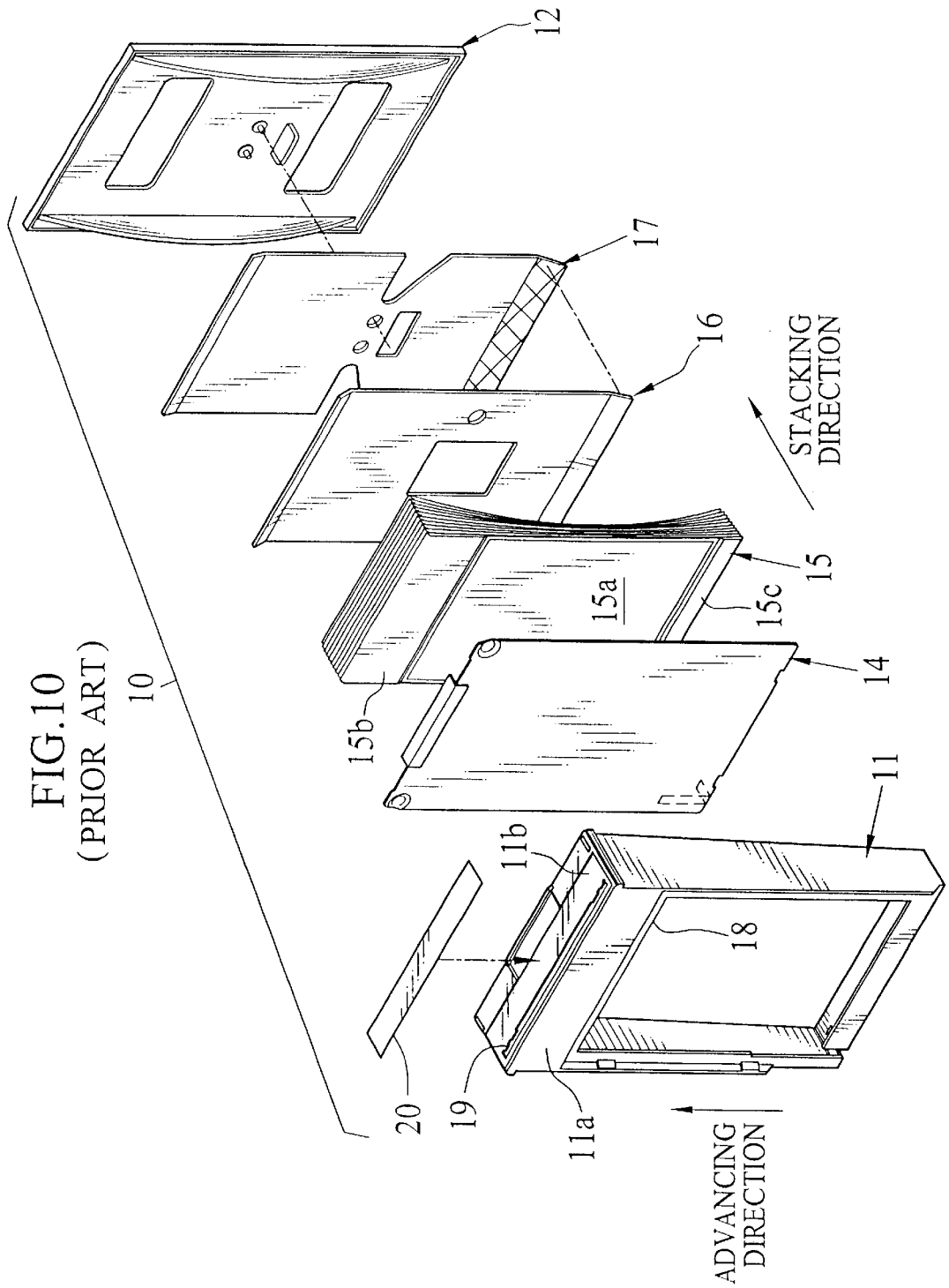
FIG. 10 is an exploded perspective view of a conventional instant photo film pack.
Figure 11:
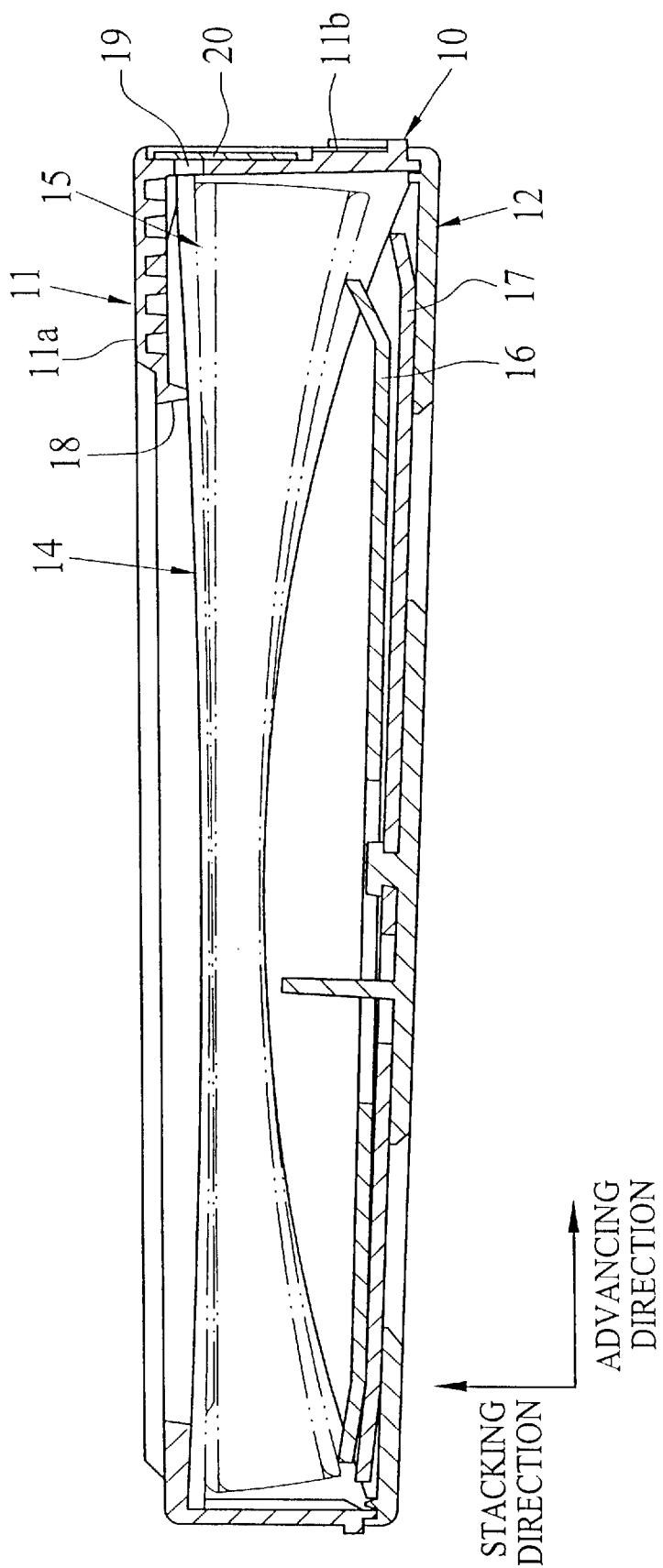
FIG. 11 is a sectional view of the conventional film pack of FIG. 10.
Figure 12:
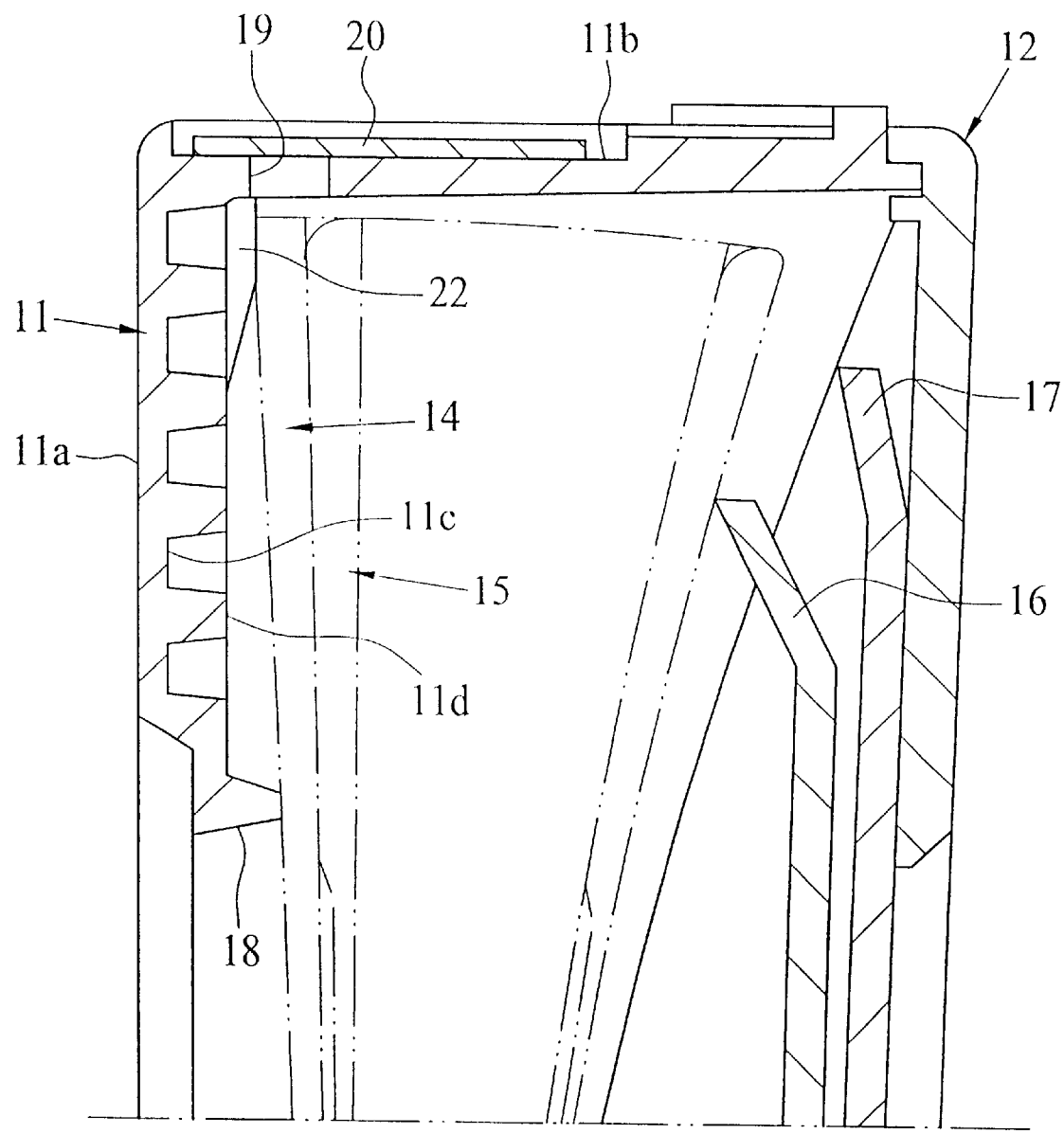
FIG. 12 is a partial sectional view of the conventional film pack of FIG. 10.
Figure 13:
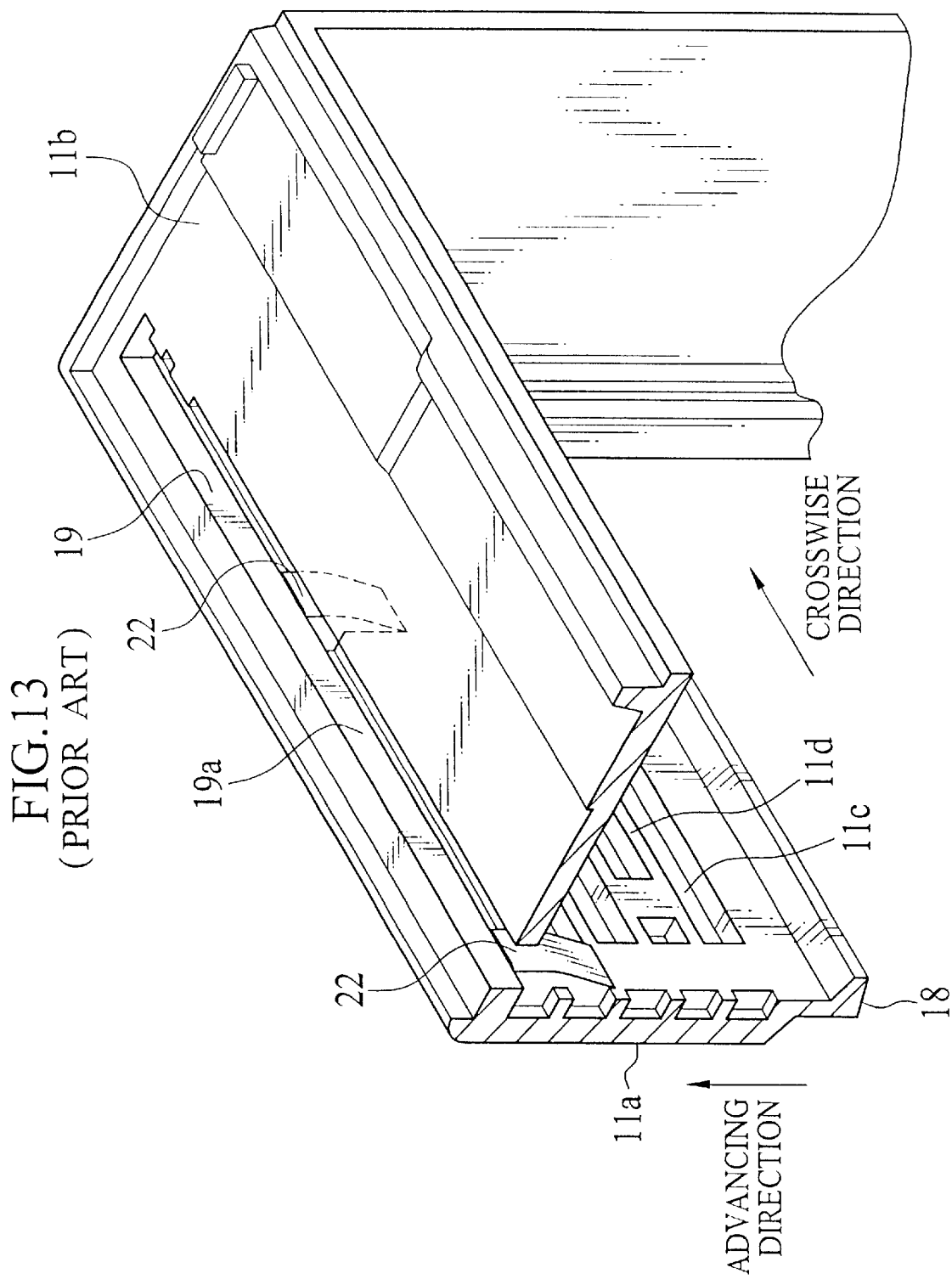
FIG. 13 is a rear perspective view of the conventional film pack of FIG. 10 with parts partially broken away.
Figure 14:
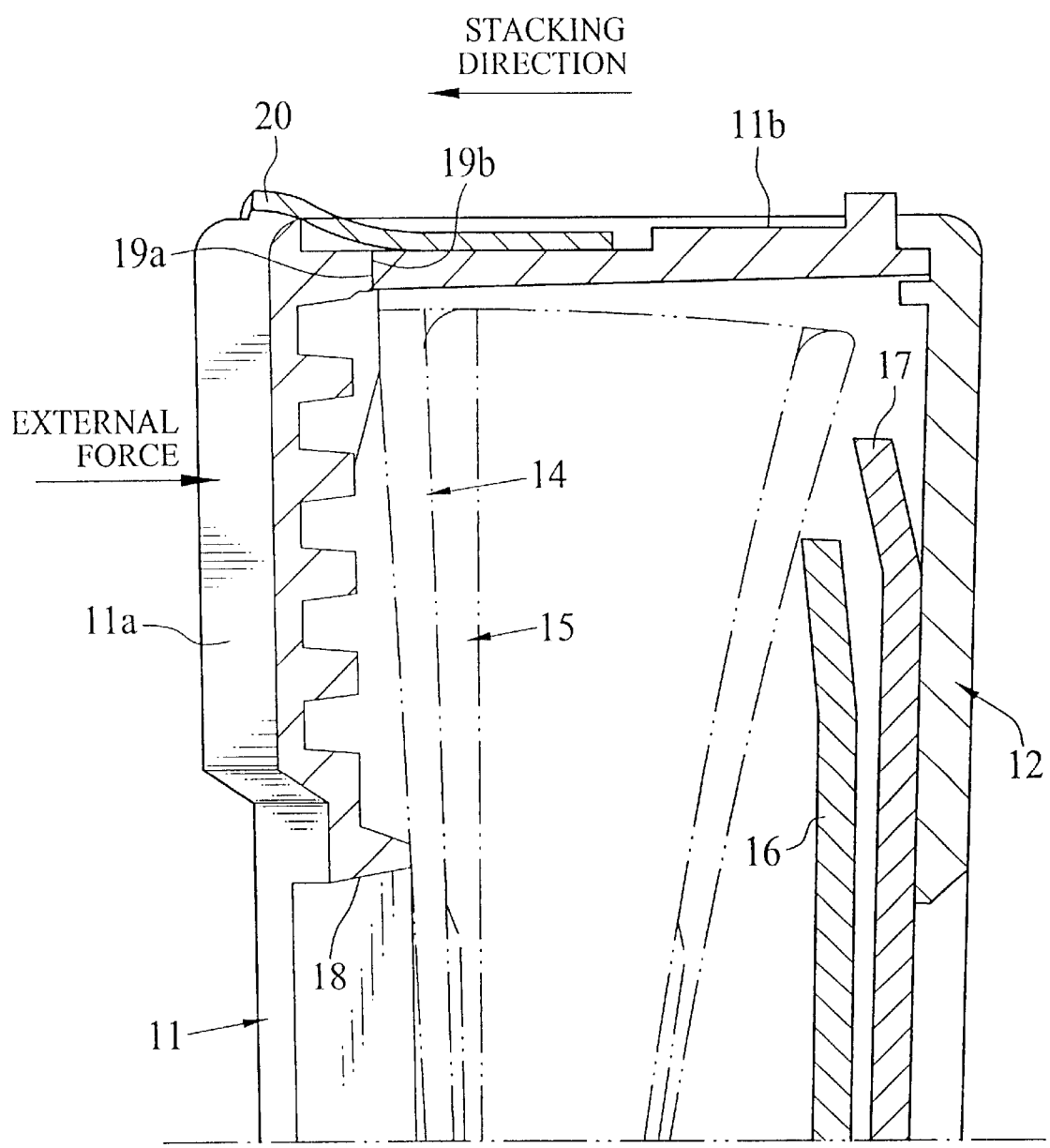
FIG. 14 is a partial sectional view of the conventional film pack of FIG. 10 with a front wall pressed down.
Figure 15:
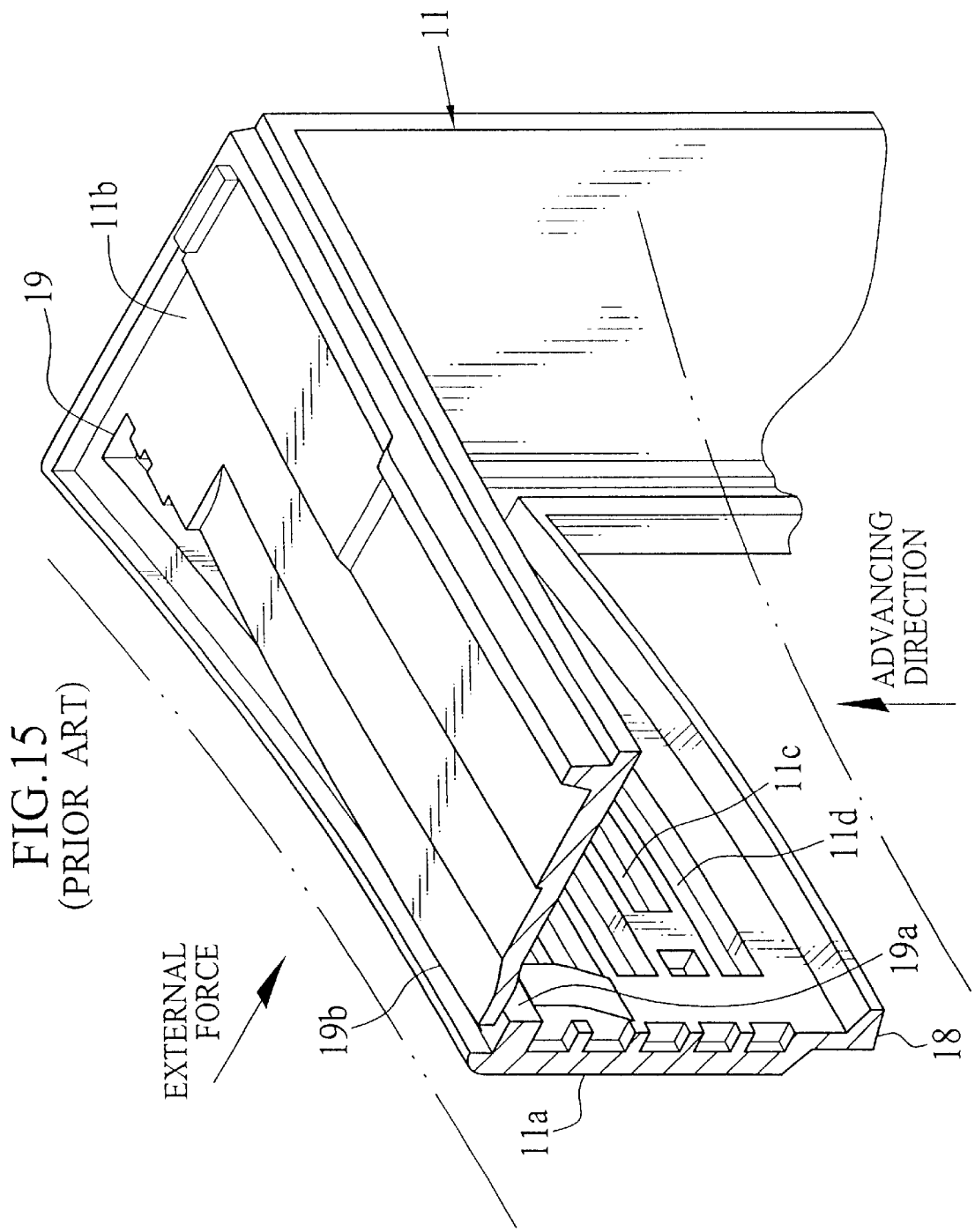
FIG. 15 is a rear perspective view of the conventional film pack of FIG. 10 with a front wall further pressed down, a front slit edge being located below a rear slit edge.

As shown in FIG. 2, the film pack 30 includes a case body 44, the film cover 31, a plurality of film units 43, a first resilient plate 45, a second resilient plate 46 and a rear cover 47. Except the case body 44, these parts are the same as those used in the conventional film unit shown in FIG. 10.

The film unit 43 is a well-known mono-sheet type, and includes a processing fluid pod 43a, an exposure area 43b and a trap portion 43c. Subject light is applied to the exposure area 43b on a photosensitive surface side to form a latent image. Developed positive image is displayed in a display area on a display surface side that is opposite to the photosensitive surface side.

A light-shielding flap 48, formed from plastic film with light-tightness, is attached to the leading end portion of the film cover 31. The light-shielding flap 48 is bent along the leading edge line of the film cover 31, to form an L-shape. One end of the light-shielding flap 48 is extended toward the film units 43 and comes in contact with an inner wall of the case body 44. Thereby, it is possible to keep the film cover 31 from being advanced out of the film pack 31 even when the film pack 31 is fallen down on the ground. A rear light-shielding flap 49 for covering the cutout 42 is attached on the other end of the film cover 31, for shielding the inside of the film pack 43 from ambient light.

In the rear cover 47 are formed two openings 47a and 47b, for allowing insertion of push members that are provided on a pack loading door for covering the pack loading chamber. The openings 47a and 47b are covered with the first and second resilient plates 45 and 46 in light-tight manner. The push members press the first and second resilient plates 45 and 46 from outside of the film pack 31 through the openings 47a and 47b. A lower portion 46a (shown by hatched lines in FIG. 2) of the second resilient plate 46 is stuck to the first resilient plate 45. The second resilient plate 46 is bent to form V-shape when being pressed by the push members. Then, the first resilient plate 45 is pressed by the upper and lower portion of the V-shaped second resilient plate 46, and presses the film units 43. Thereby, the front one of stacked film unit 43 is pressed against the front wall 44a, so evenness of the film unit 43 is improved. The configuration of the push members is disclosed in U.S. Pat. No. 5,541,683.

Two supporting ridges 50 and 51 are provided on both end portions of the rear cover 47 with reference to the crosswise direction. The supporting ridges 50 and 51 are extended in the advancing direction, and press the stack of the film units 43 toward the exposure opening 32. The processing fluid pod 43a and the trap portion 43c each have a thickness larger than the exposure area 43b. Thus, the stacked film units 43 are convexly curved toward the exposure opening 32. The supporting ridges 50 and 51 are shaped in an arc, for fitting the curve of the lowermost film unit 43.

Figure 3:
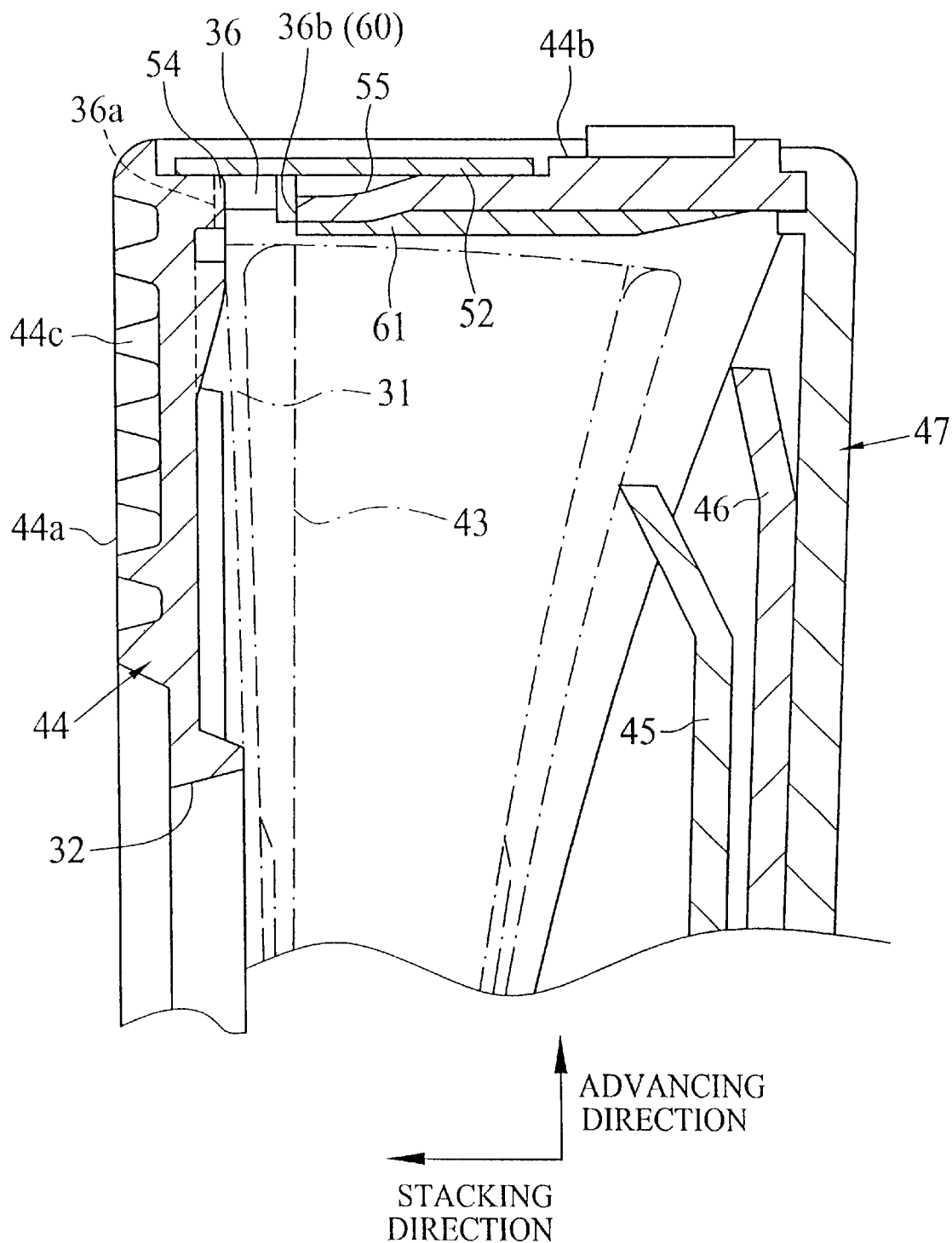
FIG. 3 is a partial sectional view of the film pack.

As shown in FIG. 3, the ejection slit 36 is formed through an upper wall 44b of the case body 44, and is covered with a light-receiving sheet 52 from outside. Two slit edges, a first or front slit edge 36a and a second or rear slit edge 36b, are confronted with each other in the ejection slit 36. A plurality of ribs 44c for compensation of strength are integrated with the front wall 44a. The ribs 44c are extended toward crosswise direction.

Figure 4:
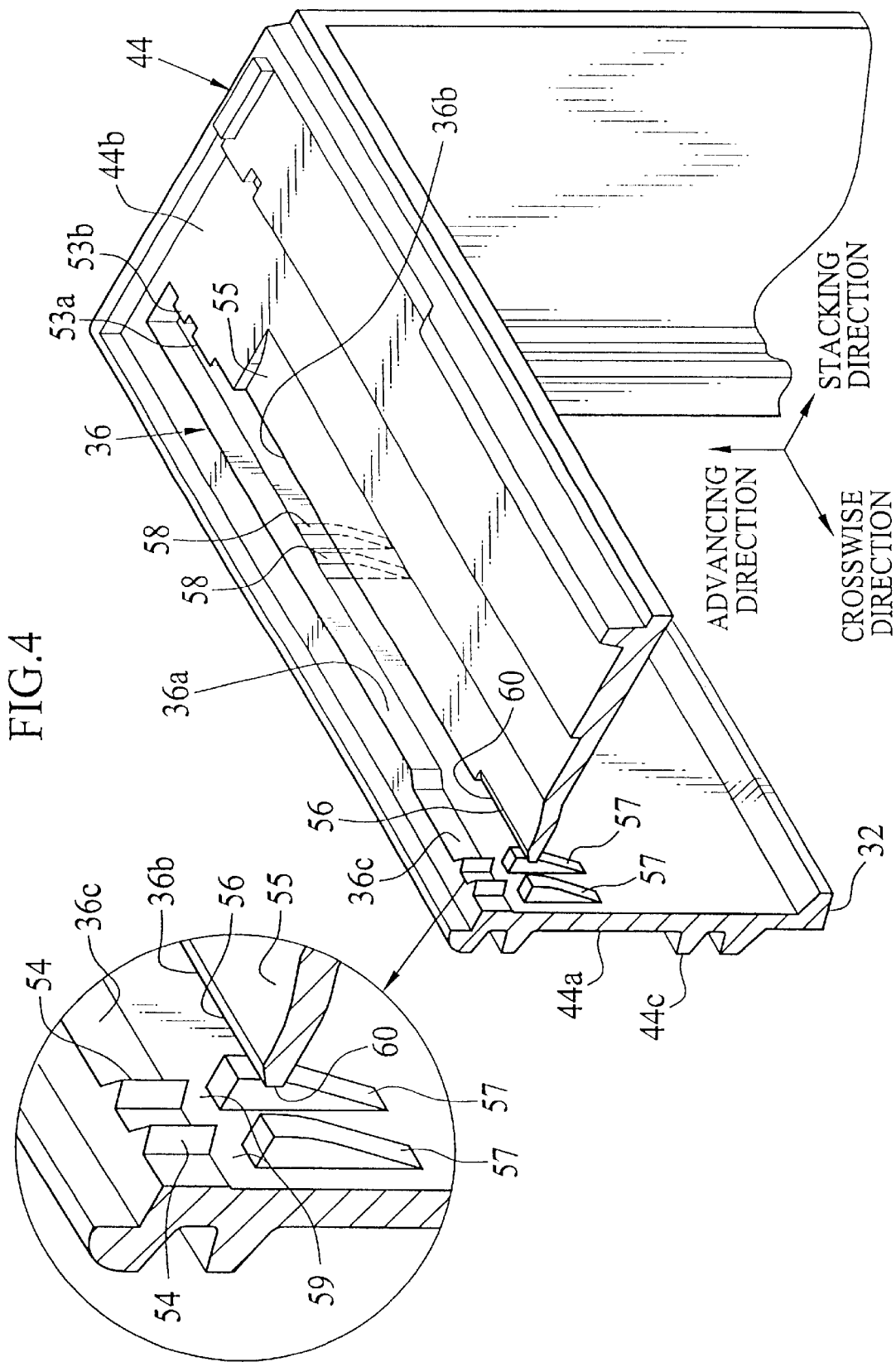
FIG. 4 is a rear perspective view of the film pack with parts partially broken away.

As shown in FIG. 4, two regulating projections 53a and 53b are formed on an end portion of the rear slit edge 36b with reference to the crosswise direction. The regulating projections 53a and 53b are also provided on the other end portion of the rear slit edge 36b. The regulating projections 53a and 53b are projected toward inside the ejection slit 36, which causes the ejection slit 36 to be partially narrower. Thereby, it is possible to prevent ejection of two or more film units 36. In order to prevent a scratch on the display surface of the film unit 43 and pass the light-shielding flap 48, the regulating projections 53a and 53b are not provided on the middle of the rear slit edge 36b.

Figure 5:
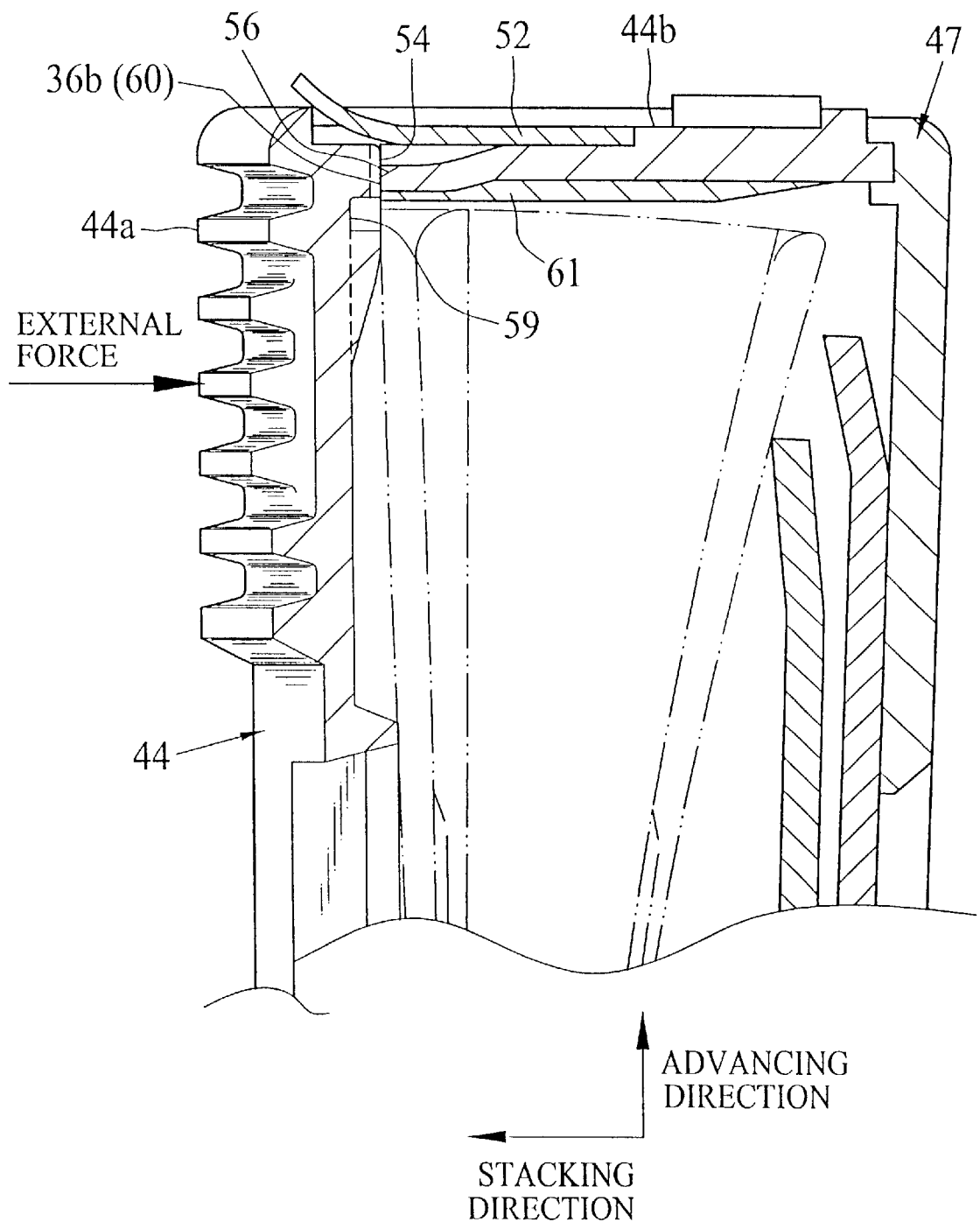
FIG. 5 is a partial sectional view of the film pack with a front wall pressed down.

In the middle of the front slit edge 36a is formed a depression 36c, on which two engaging ridges or projections 54 are provided at a certain interval. The engaging ridges 54 have the shape of a triangular prism one side of which is united with the depression 36c. The engaging ridges 54 are extended in the advancing direction, so the engaging ridges 54 and the rear slit edge 36b are crossed. The engaging ridges 54 are protruded toward the ejection slit 36, but not beyond the level of the front slit edge 36a for preventing a scratch to the exposure area 43b. As shown in FIG. 5, when the front wall 44a is pressed down by an external force, the engaging ridges 54 come in contact with the rear slit edge 36b.

In FIG. 4, in the upper wall 44b is formed a slope 55, which is inclined toward the rear slit edge 36b and projected slightly toward an inside of the case body 44. The slope 55 becomes thinner as it extends toward the rear slit edge 36b. Moreover, an outer corner is chipped to have a taper 56 in the middle of the rear slit edge 36b, so that an engaged portion 60, which is the area confronted with the engaging ridges 54, becomes sharp-pointed. When the front wall 44a is pressed down, the engaged portion 60 is pressed against the engaging ridges 54. Since the engaging ridges 54 are extended in the direction perpendicular to the engaged portion 60, the engaged portion 60 is partially hollowed by the engaging ridges 54 without being slid upward or downward. Thereby, it is possible to prevent excessive deformation of the front wall 44a, which causes rupture of the processing fluid pod 43a.

The engaged portion 60 has a thin tip and is projected downward slightly. Thus, when external force is applied to the front wall 44a in the state where the engaging ridges 54 are engaged with the engaged portion 60, the upper wall 44b is convexly curved toward the inside of the case body 44.

Figure 6:
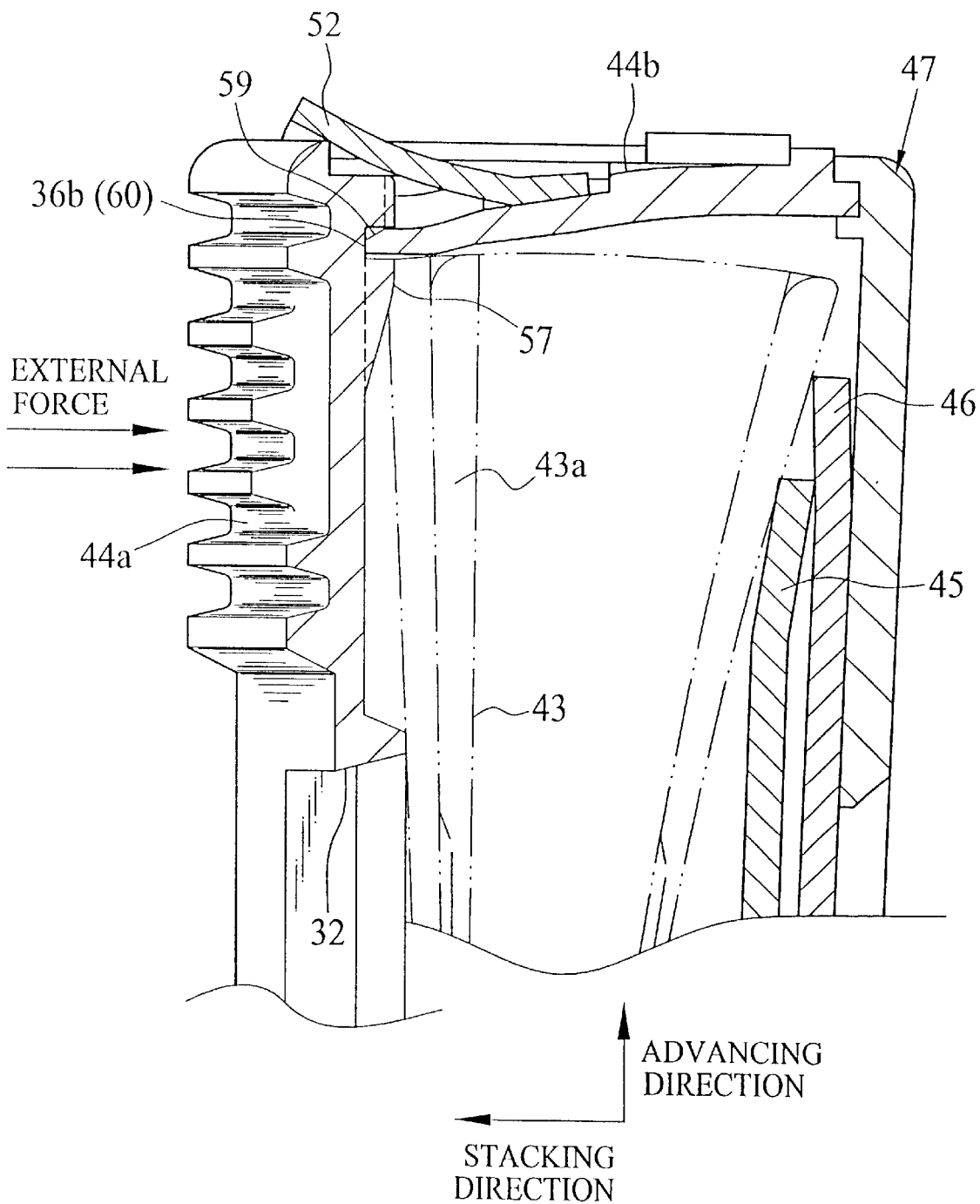
FIG. 6 is a partial sectional view of the film pack with the front wall pressed down excessively, an edge portion being fit in a gap between a guide projection and an upper wall.

The guide projection sets 57 and 58 are provided on an inside of the front wall 44a behind the ejection slit 36, as described in the prior art section. The guide projection set 57 is provided below the engaging ridges 54. Each of the guide projection sets 57, 58 is comprised of two projections arranged at a certain interval. The center guide projection set 57 is shorter than the other guide projection set 58, so there is a gap 59 between the engaging ridges 54 and the guide projection set 57. When the front wall 44a is pressed down by stronger external force, the engaged portion 60 is slipped to insert into the case body 44. Then, the engaged portion 60 is fit inside the gap 59, for locking the rear slit edge 36b, as shown in FIG. 6. Thereby, the rear slit edge 36b is not deformed any more, so the length of the stacked film units 43 in the stacking direction is kept at a certain value. Accordingly, it is possible to prevent rupture of the processing fluid pod 43a. In order to keep the rear edge 36b from deformation, it is possible to form a groove or a cutout in an inside of the front wall 44a, instead of the gap 59.

Figure 7:
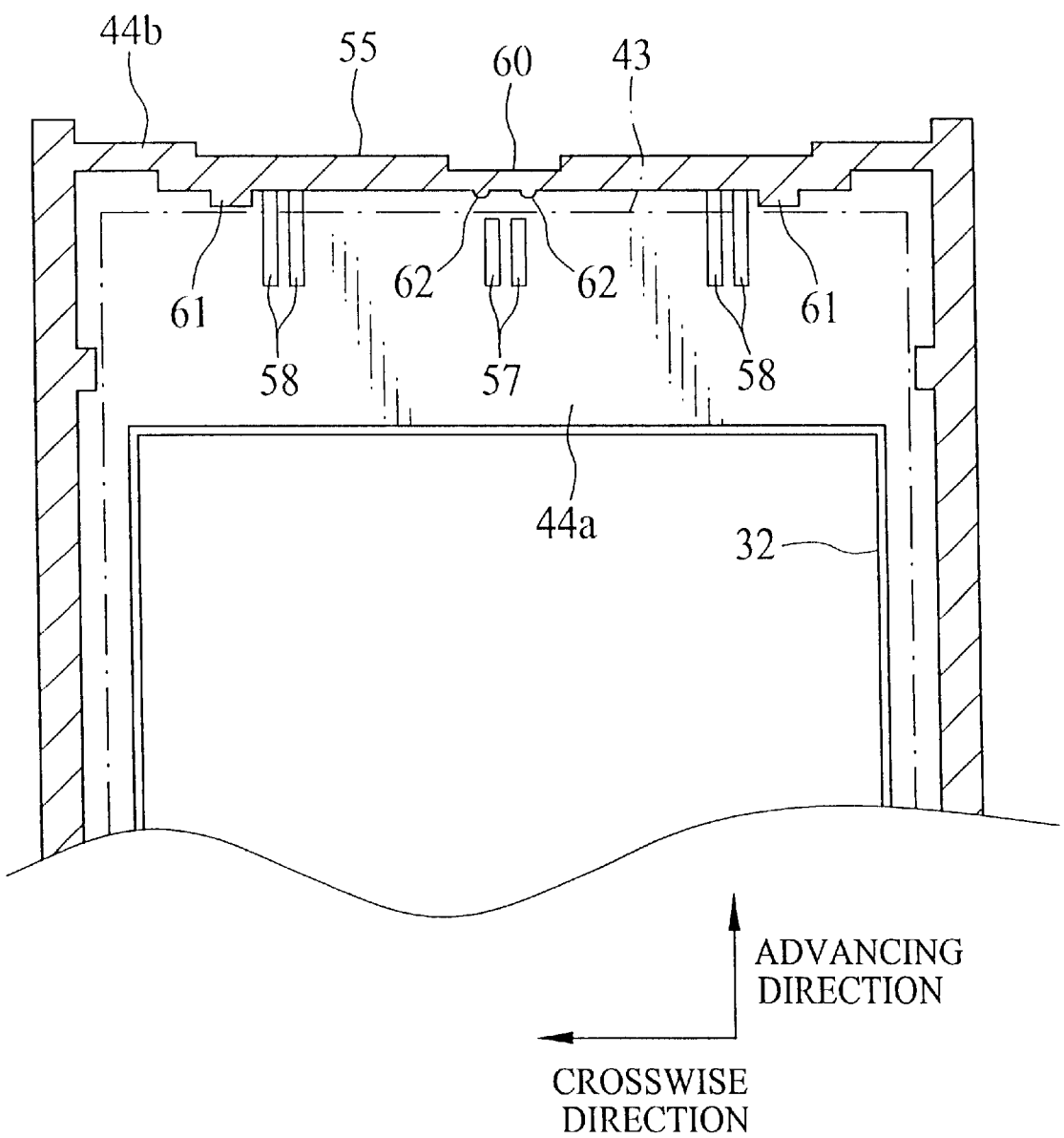
FIG. 7 is a partial sectional view of the film pack with burrs on the engaged portion.

The engaged portion 60 is depressed to have a burr 62 (see FIG. 7) when being pressed by the engaging ridges 54. The burr 62 is projected toward inside of the case body 44, so there is a possibility that the stacked film units 34 are caught by the burr 62, to prevent smooth movement of the stacked film units 34 in the stacking direction. In order to prevent this, regulating projections 61 are provided on the inside of the upper wall 44b, as shown in FIGS. 5 and 7. The regulating projections 61 are extended in the stacking direction, and is projected toward inside of the pack case 44. Stack of the film units 43 are regulated in their positions by the regulating projections 61 in manufacture. The regulating projections 61 are much higher than the burr 62, so it is possible to keep smooth movement even when the engaged portion 60 is depressed to have the burr 62.

Figure 8:
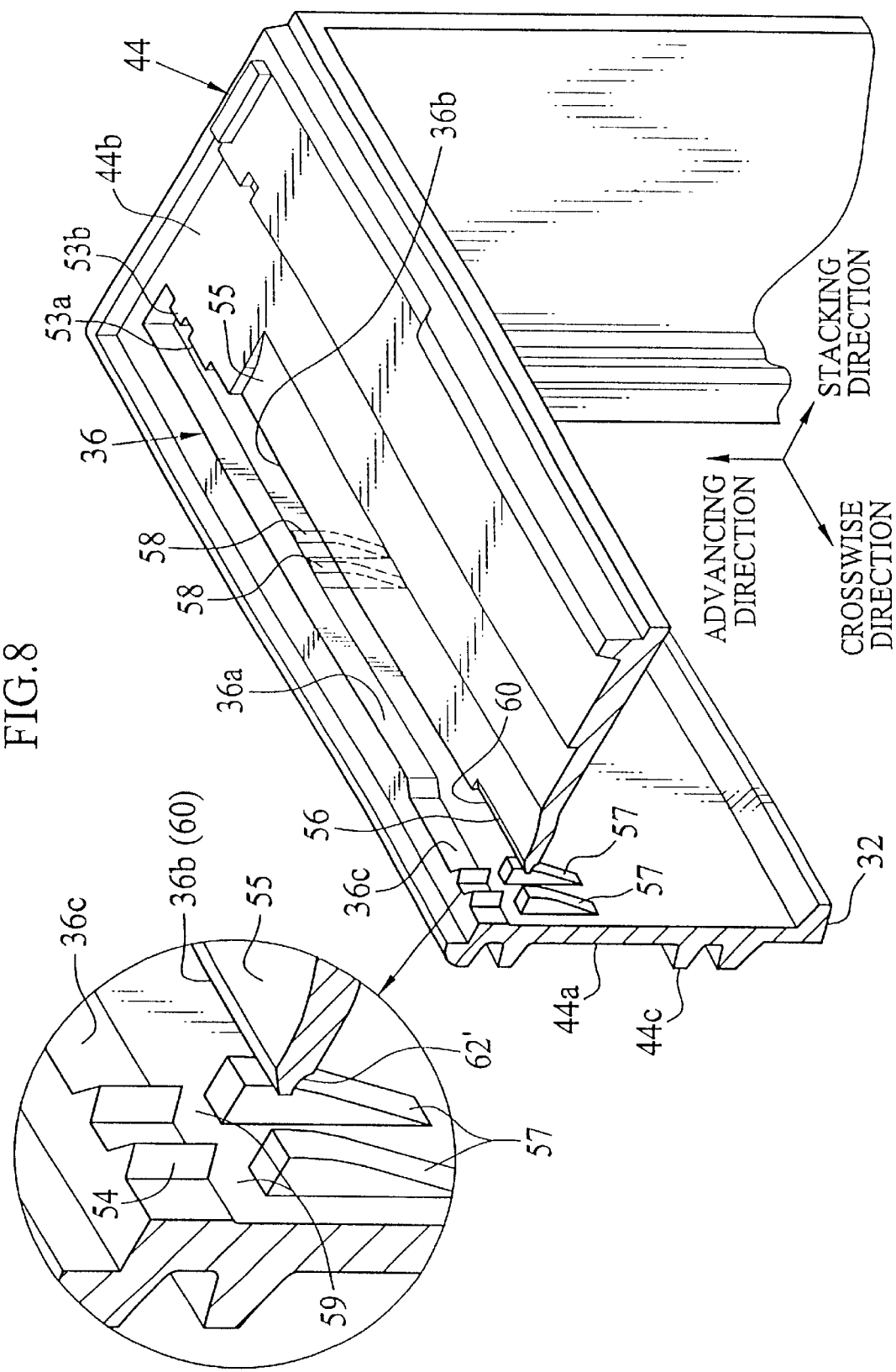
FIG. 8 is a rear perspective view of the film pack with parts partially broken away, an inner taper being formed in the engaged portion.

Instead of the regulating projections, an another taper 62' may be provided in an inner comer of the rear slit edge 36b, as shown in FIG. 8. Since the burr is not projected beyond the inner upper wall 36b, stack of the film units 43 are not caught by the burr.

Figure 9:
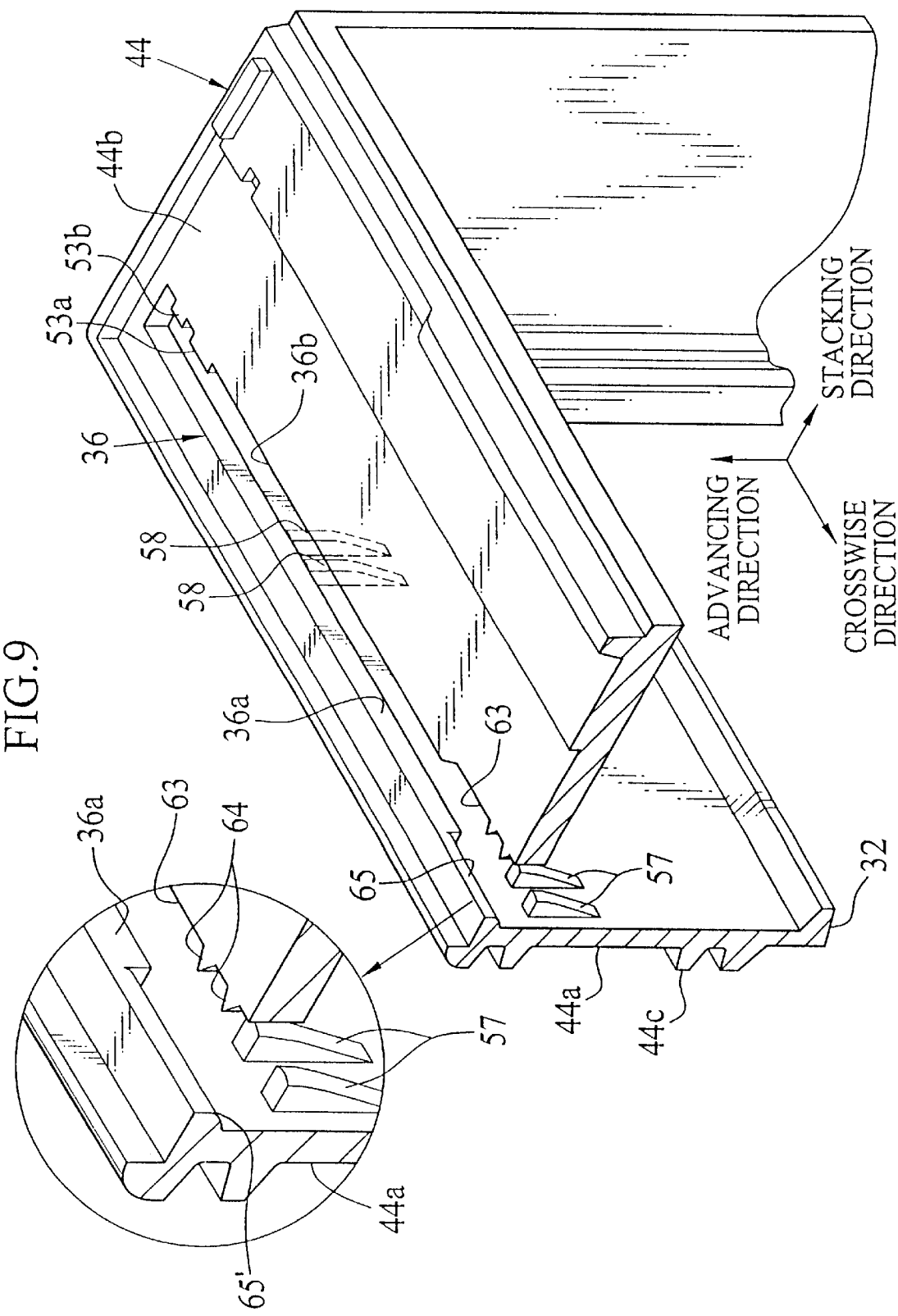
FIG. 9 is a rear perspective view of film pack of another embodiment with parts partially broken away.

In the above embodiments, the engaging ridges 54 are provided on the front slit edge 36a, and the engaging portion 60 is provided in the rear slit edge 36b. To the contrary, as shown in FIG. 9, engaging ridges 64 may be provided on the front slit edge 36a. In that case, a depression 63 is formed in the middle of the rear slit edge 36b for preventing the film unit 43 from being scratched by the engaging ridges 64. When external force is applied to the front wall 44a, the engaging ridges 64 are pressed onto an engaged portion 65 provided in the middle of the front slit edge 36a. In addition, a taper 65' may be formed in the inner comer of the front slit edge 36a, in the same way as the first embodiment. is applicable to a printer or the like. Moreover, a transfer-type film unit, in which the image display surface is opposite to the photosensitive surface, is used in the above embodiment, but the present invention is also applicable to a reflection-type film unit in which the photosensitive surface is the same as the image display surface.

Thus, the present invention is not to be limited to the above embodiments, but on the contrary, various modifications are possible to those skilled in the art without departing from the scope of claims appended hereto.

What is claimed is:

1. An instant photo film pack having a plurality of instant photo film units and a case body for containing said instant photo film units stacked in a stacking direction, an exposure opening for taking an exposure to said instant photo film unit disposed in a first wall of said case body, an ejection slit for advancing said instant photo film unit out of said instant photo film pack disposed in a second wall perpendicular to said first wall, said ejection slit being extended in a crosswise direction of said instant photo film unit and having a first slit edge and a second slit edge which are confronted with each other, said film pack comprising:

at least one engaging projection provided on said first slit edge, said at least one engaging projection being extended in an advancing direction of said instant photo film unit, which is perpendicular to said crosswise direction; and an engaged portion provided in said second slit edge, said engaging projection being engaged with said engaged portion when said first wall is deformed to close said ejection slit, for preventing further deformation of said first wall.

2. A film pack as claimed in claim 1, wherein said engaging projection is provided on the middle of said first slit edge, and said engaged portion is provided in the middle of said second slit edge.

3. A film pack as claimed in claim 2, wherein said engaging projection has a shape of a triangular prism, one side of said triangular prism being united with said first slit edge.

4. A film pack as claimed in claim 3, wherein said first slit edge is located in a side of said first wall.

5. A film pack as claimed in claim 4, further comprising:

a first guide projection provided on said first wall behind said ejection slit, said first guide projection being extended in said advancing direction and guiding said instant photo film unit toward said ejection slit.

6. A film pack as claimed in claim 5, wherein said first slit edge has a depression in the center with reference to said crosswise direction, said engaging projection being provided on said depression.

7. A film pack as claimed in claim 6, wherein the outer corner of said engaged portion is tapered off.

8. A film pack as claimed in claim 7, wherein said second wall has a slope inclined toward an inside of said case body, said second slit edge being projected toward the inside of said case body, and said engaged portion being provided in the tip of said slope.

9. A film pack as claimed in claim 8, further comprising:

a second guide projection extended in said advancing direction, said second guide projection being provided on said first wall behind said engaging projection, said second guide projection guiding said instant photo film unit toward said ejection slit; and a gap being provided between said second guide projection and said ejection slit, said engaged portion being fit into said gap when said first wall is deformed excessively.

10. A film pack as claimed in claim 9, further comprising:

a third guide projection provided on an inside of said second wall, said third guide guiding movement of stacked said film units in said stacking direction.

11. A film pack as claimed in claim 9, wherein the inner corner of said engaged portion is tapered off.

12. A film pack as claimed in claim 3, wherein said second slit edge is located in a side of said first wall.

13. A film pack as claimed in claim 12, further comprising:

a guide projection provided on said first wall behind said ejection slit, said guide projection being extended in said advancing direction, said guide projection guiding said instant photo film toward said ejection slit.

14. A film pack as claimed in claim 13, wherein said first slit edge has a depression in the center with reference to said scrosswise direction, said engaging projection being provided on said depression.

15. A film pack as claimed in claim 14, wherein the inner corner of said engaged portion is tapered off.

* * * * *